United States Patent
Connor et al.

(10) Patent No.: US 12,086,306 B2
(45) Date of Patent: Sep. 10, 2024

(54) CONTENT MODIFICATION SYSTEM AND METHOD

(71) Applicant: Sony Interactive Entertainment Inc., Tokyo (JP)

(72) Inventors: Patrick John Connor, London (GB); Jessica Rose Grant, London (GB); Hans-Werner Gellersen, Lancaster (GB); Ludwig Sidenmark, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/272,427

(22) PCT Filed: Aug. 30, 2019

(86) PCT No.: PCT/GB2019/052434
§ 371 (c)(1),
(2) Date: Mar. 1, 2021

(87) PCT Pub. No.: WO2020/049280
PCT Pub. Date: Mar. 12, 2020

(65) Prior Publication Data
US 2021/0318753 A1 Oct. 14, 2021

(30) Foreign Application Priority Data
Sep. 6, 2018 (GB) .................................. 1814505

(51) Int. Cl.
| G06F 3/0482 | (2013.01) |
| G06F 3/01 | (2006.01) |
| G06F 3/04842 | (2022.01) |

(52) U.S. Cl.
CPC .............. *G06F 3/013* (2013.01); *G06F 3/012* (2013.01); *G06F 3/0482* (2013.01); *G06F 3/04842* (2013.01)

(58) Field of Classification Search
CPC ........ G06F 3/013; G06F 3/012; G06F 3/0482; G06F 3/04842; G06F 3/011; G06F 3/01; G06F 3/0481; G06F 3/048; G06F 3/0484
See application file for complete search history.

(56) References Cited

U.S. PATENT DOCUMENTS 6,535,644 B1 *  3/2003  Kurapati .............. H04N 19/167
                                             382/240
7,401,920 B1 *  7/2008  Kranz ................... A61B 3/113
                                             351/209
(Continued)

FOREIGN PATENT DOCUMENTS

WO    2020049280 A1    3/2020

OTHER PUBLICATIONS

Examination Report for corresponding GB Application No. GB1814505.2, 5 pages, dated Apr. 16, 2021.
(Continued)

*Primary Examiner* — Ryan F Pitaro
(74) *Attorney, Agent, or Firm* — Matthew B. Dernier, Esq.

(57) ABSTRACT

A processing system for modifying interactive content includes: a user profile obtaining unit operable to obtain the user profile including information about an eye-in-head radius, the eye-in-head radius representing an amount of a display viewable by a user without moving their head, an interactive element identification unit operable to identify interactive elements in displayed content, and to identify selection areas associated with each identified interactive element, and a content modification unit operable to modify interactions between a user and one or more of the identified (Continued)

interactive elements in dependence upon the obtained user profile, the content modification unit is operable to locate one or more of the identified interactive elements in dependence on the eye-in-head radius, and the content modification unit is further operable to determine an overlap threshold between the eye-in-head radius and each selection area in order for an interaction with a corresponding interactive element to be performed.

14 Claims, 9 Drawing Sheets

(56) References Cited

U.S. PATENT DOCUMENTS

| | | | | |
|---|---|---|---|---|
| 9,589,384 | B1* | 3/2017 | Waggoner | G06T 15/00 |
| 9,596,508 | B2* | 3/2017 | McCoy | H04N 21/44218 |
| 9,665,171 | B1* | 5/2017 | Skogo | G09G 5/37 |
| 10,223,573 | B2* | 3/2019 | George | G06F 3/0346 |
| 2006/0256133 | A1* | 11/2006 | Rosenberg | G06F 3/013 345/619 |
| 2008/0201225 | A1* | 8/2008 | Maharajh | H04L 65/4084 705/14.43 |
| 2009/0234716 | A1* | 9/2009 | Mallick | G06F 3/0482 705/14.54 |
| 2011/0267374 | A1* | 11/2011 | Sakata | H04N 21/4882 345/672 |
| 2012/0295708 | A1* | 11/2012 | Hernandez-Abrego | G06F 3/167 463/36 |
| 2014/0096077 | A1* | 4/2014 | Jacob | G06F 3/013 715/810 |
| 2014/0123162 | A1* | 5/2014 | Karlsson | H04N 21/8456 725/12 |
| 2014/0267420 | A1* | 9/2014 | Schowengerdt | G06T 19/006 345/633 |
| 2014/0282646 | A1* | 9/2014 | McCoy | H04N 21/44213 725/12 |
| 2015/0130703 | A1* | 5/2015 | Ghajar | G06F 3/013 345/156 |
| 2015/0169138 | A1* | 6/2015 | Liu | G06Q 50/01 715/728 |
| 2015/0212576 | A1 | 7/2015 | Ambrus | |
| 2015/0261318 | A1 | 9/2015 | Scavezze | |
| 2015/0277710 | A1* | 10/2015 | Lee | G06F 3/0488 715/822 |
| 2015/0338915 | A1* | 11/2015 | Publicover | G06F 21/316 345/633 |
| 2016/0025981 | A1 | 1/2016 | Burns | |
| 2016/0026253 | A1* | 1/2016 | Bradski | H04N 13/167 345/8 |
| 2016/0131902 | A1* | 5/2016 | Ambrus | G02B 27/0093 345/156 |
| 2016/0274660 | A1* | 9/2016 | Publicover | G02B 27/017 |
| 2017/0090563 | A1* | 3/2017 | Gustafsson | G06F 3/0485 |
| 2017/0213377 | A1* | 7/2017 | Torii | H04N 21/47 |
| 2017/0287446 | A1* | 10/2017 | Young | G06F 3/013 |
| 2017/0364760 | A1* | 12/2017 | Canella | G06T 7/75 |
| 2018/0004285 | A1* | 1/2018 | Castleman | H04L 65/602 |
| 2018/0052514 | A1* | 2/2018 | Liu | G06V 40/10 |
| 2018/0096517 | A1* | 4/2018 | Mallinson | G02B 27/0093 |
| 2018/0165506 | A1* | 6/2018 | George | G06F 3/013 |
| 2019/0004823 | A1* | 1/2019 | Walker | G06F 40/106 |
| 2019/0038964 | A1* | 2/2019 | Veeramani | A63F 13/67 |
| 2019/0196576 | A1* | 6/2019 | Saarinen | G06T 19/006 |
| 2019/0204913 | A1* | 7/2019 | Sarkar | G06F 3/013 |
| 2019/0221191 | A1* | 7/2019 | Chhipa | G09G 3/002 |
| 2020/0082794 | A1* | 3/2020 | Sanders | G06F 3/013 |
| 2020/0336801 | A1* | 10/2020 | Harviainen | G02B 27/017 |
| 2021/0004081 | A1* | 1/2021 | Sugihara | G06F 3/012 |
| 2021/0349528 | A1* | 11/2021 | Son | G06F 3/013 |

OTHER PUBLICATIONS

International Search Report and Written Opinion for corresponding PCT Application No. PCT/GB2019/052434, 12 pages, dated Nov. 11, 2019.
Combined Search and Examination Report for corresponding GB Application No. GB1814505.2, 7 pages, dated Feb. 28, 2019.
Communication pursuant to Article 94(3), to corresponding EP Application No. 19763069.2, 4 pages, dated Aug. 2, 2022.
Communication pursuant to Article 94(3), to corresponding EP Application No. 19763069.2, 6 pages, dated Sep. 29, 2023.

* cited by examiner

CONTENT MODIFICATION SYSTEM AND METHOD

BACKGROUND

This disclosure relates to a content modification system and method.

In recent years there has been a trend towards providing more natural inputs for users of processing devices, such as video consoles or computers. For example, motion sensing controllers may be provided that enable a user to use gestures to input commands rather than relying entirely on button presses. While considered to be an intuitive manner of inputting commands, in some cases this may not be desirable due to the cost or inconvenience associated with the use of dedicated input devices; this is particularly true when applications or hardware have dedicated hardware that cannot be used for other purposes, as users may wish to make use of a number of different applications or hardware arrangements.

Another example of such an input is that of tracking a user with one or more cameras; for example, tracking hand gestures, head motion or eye motion. The cameras may be associated with a games console or a computer, for example, or may be part of a standalone tracking system. Such methods may enable a user to interact with a system without the use of any peripherals, and as such may be considered to be natural and convenient input methods. However, these user-tracking methods may also have a number of potential drawbacks.

For instance, providing gesture-based inputs may require a user to position themselves in an area with a lot of room for movement, which may be inconvenient. Additionally, by having to move body parts the user may become tired or uncomfortable—particularly if the motion is frequent, repetitive, or unnatural to the user, or if they have limited mobility. Such problems may become more apparent when used in combination with a virtual reality (VR) arrangement in which a user views content on a head-mountable display (HMD); in this example use case, the user is unable to see obstacles in the real environment and may need to move more as the (potential) display area is increased (as the user is generally placed in a virtual environment that exists in every direction) relative to a fixed display such as a television.

SUMMARY

In view of this, it is considered desirable to provide a more comfortable user experience to enhance the user's enjoyment of interactive content. In particular, a system and method for providing an improved camera-based tracking and interaction may be desirable.

It is in the context of the above problems that the present invention arises.

Further respective aspects and features of the disclosure are defined in the appended claims.

BRIEF DESCRIPTION OF THE DRAWING

Embodiments of the present invention will now be described by way of example with reference to the accompanying drawings, in which:

FIGS. 10-13 schematically illustrate a selection process for an interactive element on a display screen;

DETAILED DESCRIPTION

While the specification refers largely to arrangements in which an HMD is the display device used to display content to a user, the teachings provided may be equally applicable to more traditional arrangements in which a television (or other display) is used to present content to the user.

Figure 1:
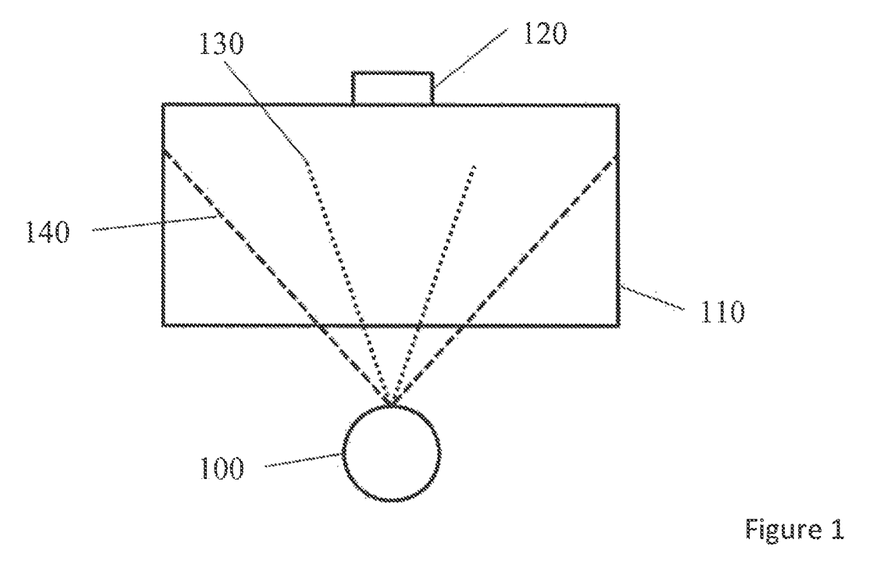
FIG. 1 schematically illustrates a content viewing arrangement.

FIG. 1 provides a schematic illustration of such an arrangement; as is apparent from this illustration, the user's gaze is directed towards only a portion of the display, and as a result the user is required to move their head in order to view other portions of the display.

In this Figure, the user 100 is viewing content presented on the display 110. A camera 120 is also shown on top of the display 110; the camera 120 may be used to track a user's motion (for example, eye, head or body motion). The cone 130 represents the viewing angle for the user 100 looking straight ahead, ignoring peripheral vision areas. The cone 130 may be moved either by the user 100 moving their eyes, head, or whole body (for example). The cone 140 represents the required viewing angle to view the whole of the display 110—as this is clearly larger than the cone 130, it is expected that the user will have to move their head and/or eyes in order to view the whole of the display 110.

Figure 2:
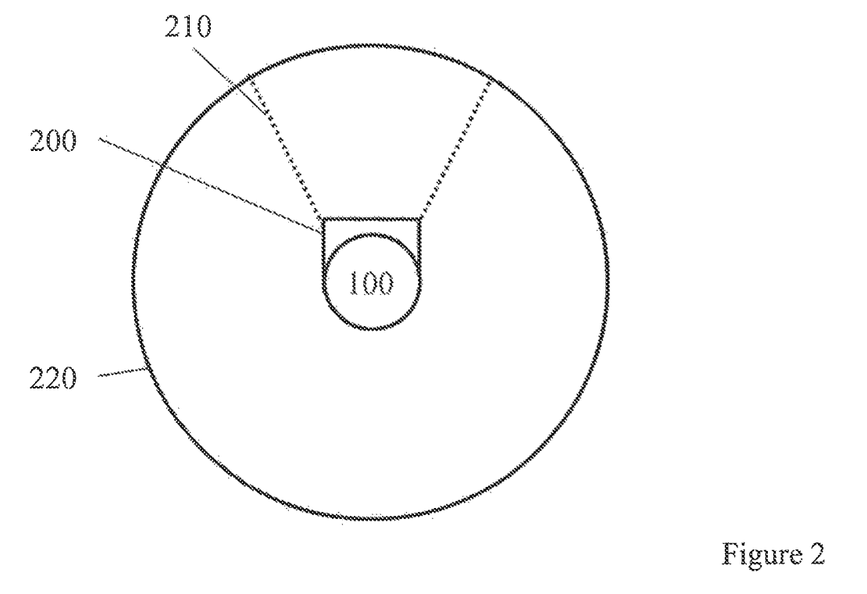
FIG. 2 schematically illustrates a second content viewing arrangement.

An alternative arrangement is shown in FIG. 2, which schematically illustrates a comparable arrangement in which a user 100 instead uses an HMD 200 as a display device. The user 100 is presented with a view corresponding the region 210 of the virtual environment 220. In this case, the user is able to view different areas of the region 210 using eye movement alone, while viewing areas outside of the virtual environment 220 of the region 210 may also require head motion.

In each of these arrangements it is necessary for users to move their head and/or their eyes in order to view all of the content that is displayed (and/or able to be displayed, in the case of the HMD). However, the use of head and/or eye motion for viewing content out of the user's immediate field of view may vary from person to person.

For example, some users may rely heavily on head motion and entirely forgo eye motion—whenever the user wishes to view something that is not directly in front of them, they move their head until the target is directly in front of them. Of course, such users may be rare and it is expected that at least some eye motion is used.

At the other end of the spectrum, there may be users that rely heavily on eye motion, such that head motion is only performed when it is physically impossible for the user to view content at that head position.

It would be expected that most users would exist somewhere on the spectrum between these two extremes, such that different users may use different combinations of head and eye motion to acquire a desired view.

It is generally considered that eye motion is less demanding and more comfortable for a user than head motion, especially during extended viewing sessions. It may therefore be advantageous to tailor a user experience to take into account when a viewer will move their head and/or eyes; this may be of particular interest in view of interactive content, where head and/or eye motion may be used to provide inputs to the content.

In view of this, it is considered advantageous that a user profile is generated that comprises information relating to the user's preferences regarding head and eye motion. While any suitable method may be used to derive profile information, a specific calibration process is provided below so as to exemplify the gathering of such data. Whichever method is selected, it is considered that information should be gathered that identifies motions performed by a user to view content in different areas—this motion should be characterised in terms of the head motion and eye motion that, combined, make up the motion.

Figure 3:
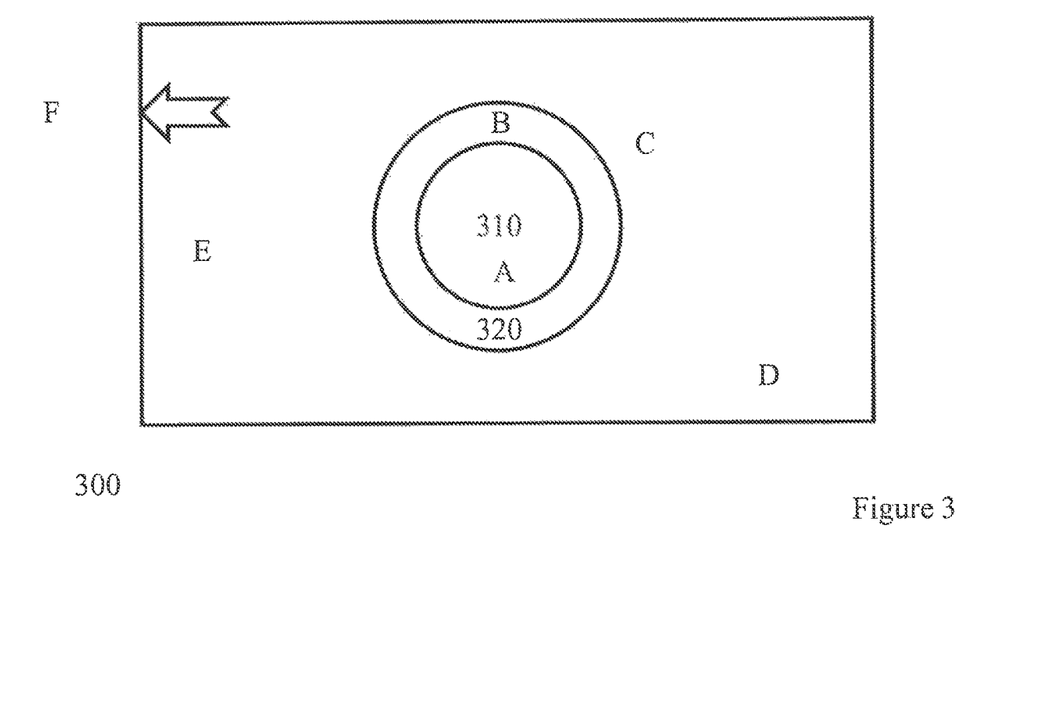
FIG. 3 schematically illustrates a display screen during a calibration process.

FIG. 3 schematically illustrates a screen that may be displayed to a user during a calibration process for capturing information about head and/or eye motion. A display 300 (corresponding to a view provided by an HMD, for example, or a display screen such as a TV) is shown with concentric circles 310 and 320 that illustrate a user's focus area and a surrounding region of vision respectively.

A number of markers are also shown on the display 300, represented by letters A-E, and the user may be invited to look at each of them in turn. A further marker (F) is shown that is outside of the display 300, but may be viewable by a user changing the viewpoint that is displayed—depending on the arrangement, this may be performed by user input or head motion, for example. An example of a calibration process using this arrangement is provided below.

Firstly, a user is instructed to look at the letter A; as this is within the region 310 this is expected to result in little or no eye motion, and no head motion. The user may be invited to provide an input (such as a button press or spoken command) to indicate that they are looking at the letter A, or this may simply be identified using eye tracking data.

The user is then instructed to look at the letter B. As this is only slightly out of the central area 310 of the user's gaze, it is expected that most users will simply adjust their gaze upwards such that the region 310 is now centred on (or at least contains) the letter B. This would be expected to be performed.

Following this, the user may then be immediately directed towards the letter C, or may be instructed to return to marker A before progressing to viewing the letter C.

The letter C may not be visible to a user, or only visible in the user's peripheral vision. It would likely be uncomfortable for many users to view the letter C using eye motion alone. Viewing the letter C would therefore be expected to induce a head motion from most users.

The viewing of the letter D provides a similar effect to that of viewing the letter C, albeit more exaggerated. A larger head motion would be expected here that that associated with viewing the letter C, due to the increased distance between letters.

In a similar fashion, the viewing of the letter E would be expected to induce an even larger head motion from the user. When the user transitions between viewing letters with a larger separation, the combination of head and eye motion performed by the user may be identified. For example, a first user may move their head such that the letter appears in the centre of their vision—thereby performing head motion with no eye motion. A second user may move their head only far enough to enable the user to perform their maximum comfortable eye motion in order to view the letter. Other users may perform combinations of head/eye motion that lie between these two, and this may be identified through a number of different transitions being induced by the calibration process.

The final letter, F, that is shown is outside of the display area 300. An arrow is provided that indicates to the user where the letter F may be found—the user should then either provide controller inputs or rotate their head/body sufficiently to cause the letter F to enter the display area 300.

By instructing the user to perform a number of viewpoint changes of different magnitudes and directions, a profile may be generated. For example, the largest distance between markers that a user will view without performing any head motion may be identified. The combinations of head motion, user input, and eye motion used to view a marker a particular distance away may also be identified; for example, a profile may comprise a list of angular separations between displayed objects (such as an entry for every five or ten degrees of separation) and the action performed by the user. Optionally, such angular separation may be separated into horizontal and vertical components with entries for each, since user mobility and behaviour may be different for similarly sized horizontal and vertical angular separations. Similarly optionally, the letters/markers shown in FIG. 3 may be positioned or sequenced to cause at least some predominantly horizontal or predominantly vertical transitions of eye and/or head motion during calibration.

The actions performed may be recorded in any suitable manner; one example of a suitable method is that of a lookup table with three columns. A first column may relate to eye motion, a second to head motion, and a third to body/torso motion. Each of these may comprise a value indicative of the amount of motion performed—for example, an angular change to the viewpoint resulting from each component, or a percentage of the transition motion that is contributed by each component.

Alternatively, or in addition, a categorisation may be applied to each user that matches them to a reference profile that resembles their pattern of eye/head/body motion. In a most basic example, a user could be classed as a 'head-mover' if they move their head more frequently than some threshold amount or an 'eye-mover' if they do not. Any number of categories could be defined, so as to represent the spectrum of different users in a suitably accurate manner.

Of course, the order in which a user is instructed to view different markers may be varied. Different markers may also be provided for different users, and the number of markers used may be selected freely—indeed, the calibration process may be open-ended and continue generating markers until a suitably accurate profile is generated.

In some examples, the order, number, and location of markers may be varied in response to the calibration data as it is generated. For example, markers may be selected to alternately induce head motions and only-eye motions; by doing this, the boundary at which a user begins to use head motions in addition to eye motion may be identified more quickly in some cases.

Alternatively, or in addition, the order, number, and location of markers may be selected in dependence upon user information. For example, a user could provide information about their habits (or information could be gathered by performing tracking pre-calibration) to determine whether significant head motion is expected or not. Similarly, statistical data about a user (such as age, gender, or height) and/or their equipment usage (TV/HMD, distance from display, main applications/application type) may be used to identify an expected profile, and calibration may be performed to identify deviations from this expected profile. Such an expected profile may be derived from statistical data gathered through other calibrations, for example.

Calibrations may also be performed in different use cases, so as to generate a time- or user condition-based profile. For instance, as a user becomes more tired (either at night, on a work/school night, or after a long gaming session, for example) the amount of user head motion may be reduced significantly in favour of eye motion as this would be less energetic for the user. Alternatively, or in addition, changes due to these (or other) factors may be modelled and applied to a single or a small number of calibrations by a user.

The format of markers may be varied in order to provide a more detailed profile; for example, users may respond to different colours in different manners. A visually striking colour, such as a bright yellow or red, may induce a greater head motion than a less visually striking colour, such as a pale blue or green. This may be a result of certain colours either catching the user's attention more due to personal preference, or by being colours associated with particular emotions (such as fear or danger). Similarly, some shapes may have different effects on the user's actions and therefore markers having different shapes may be incorporated into a calibration process.

In some embodiments, the calibration process may incorporate a time-limited element. Generally, eye motion is faster than head motion and so it may be expected that some users may increase their reliance on eye motion over head motion when a faster viewing transition is required. This may be implemented in a number of ways—for example, a timer may be provided, or the user may be rewarded for performing the calibration process (or a portion of the process) within a particular time. Alternatively, or in addition, markers may be designed so as to encourage a faster head motion by using particular colours or shapes and/or the calibration may be provided in a context that causes a user to become more (or less) excited and therefore react more (or less) energetically.

Figure 4:
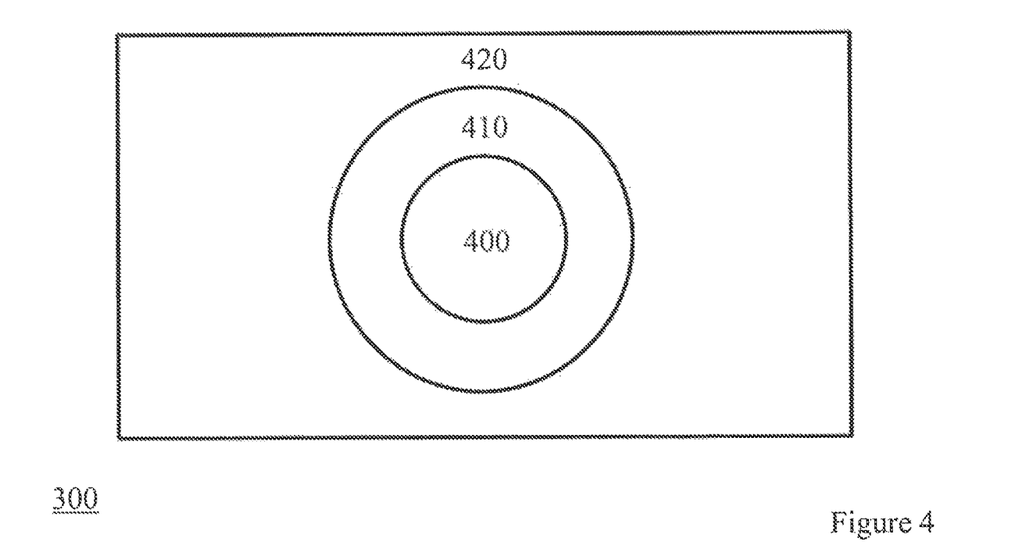
FIG. 4 schematically illustrates a display screen divided into regions for a first user.

FIG. 4 schematically illustrates the screen 300 separated into three regions. The first of these is the inner, or focal, region 400—this is the area that occupies the centre of a user's gaze when the user directs their head and eyes towards the centre of the screen 300. This is an area that would be most in-focus for a viewer.

The surrounding region 410 represents the region of the screen 300 that the user is able to see, for example in their peripheral vision, but would need to move their eyes/head to be able to view correctly. The extent of the region 410 is equivalent to the range of motion of a user's eyes—the boundary between the areas 410 and 420 represents the outermost area that a user is able to view by moving their eyes only, which may be referred to as a maximum eye-in-head radius.

The remaining region 420 of the screen 300 corresponds to areas which the user is not able to view without moving their head—that is, even at a maximum eye rotation by the user they are unable to view any areas outside of the regions 400 and 410.

Of course, the regions 400 and 410 can be determined on a per-user basis. In addition to this, or instead, the regions may be determined upon user preferences rather than a user's physical limitations. For example, the region 410 may be smaller for a first user than a second user of equal physical capabilities if the first user is more inclined to move their head than to change their view using eye motion only (for example, a 'head-mover' as described above). In this sense, the region 410 may be considered a preferred eye-in-head radius, rather than a maximum. References to the eye-in-head radius in this specification should be taken to mean either the physical maximum or the preferred maximum eye motion for a given head position.

It should be considered that some users may be more comfortable moving their eyes and/or head in some directions than others; in such a case, it is not required that the regions 400 and 410 are circular and they may instead take any suitable shape.

Figure 5:
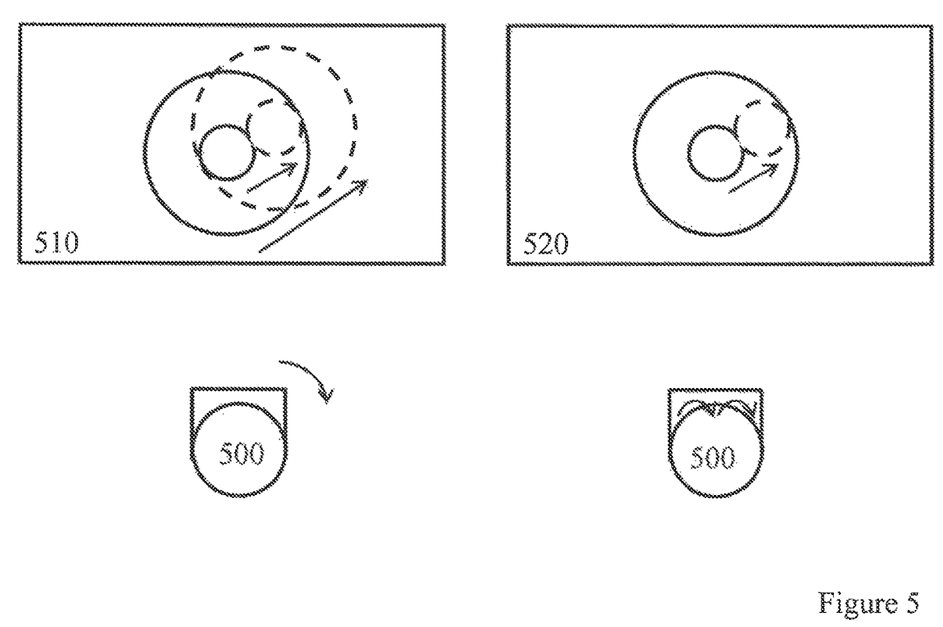
FIG. 5 schematically illustrates examples of two different methods for performing a viewing transition.

FIG. 5 schematically illustrates examples of two different methods for performing a viewing transition. FIG. 5 shows a user wearing an HMD, and the display that is associated with that HMD (although of course, these teachings could be applied to a more typical display screen arrangement such as a television). A viewing transition here means the action performed by a user to transfer their gaze from one part of a display to another. In the examples 510 and 520, the user 500 has moved their gaze and/or eye-in-head radius from the areas denoted by the solid lines to the areas denoted by the dashed lines. The smaller circle shows the focus position (equivalent to the region 400 of FIG. 4) while the larger circle shows the eye-in-head radius (equivalent to the region 410 of FIG. 4).

In the example 510, the user 500 performs the viewing transition by moving their head only, with the eye position remaining stationary with respect to the user's head. As noted above, this method of performing a transition is considered to be rare.

The example 520 shows the opposite method of performing the transition; the user 500 moves only their eyes, with the head position remaining stationary with respect to the display.

Figure 6:
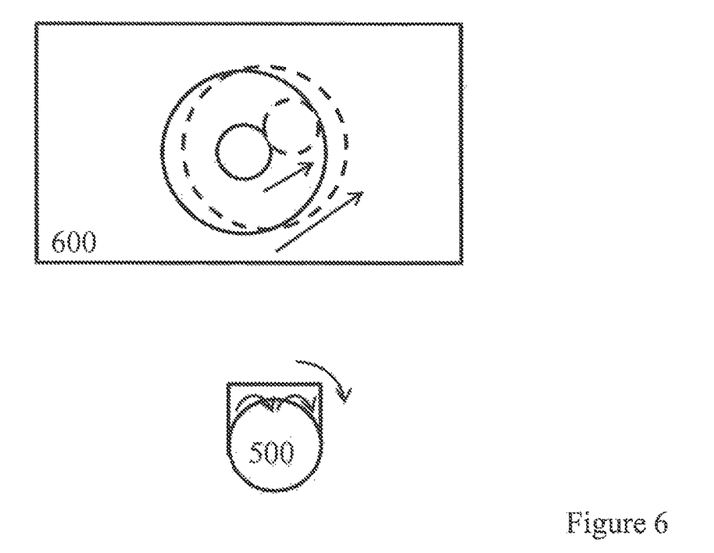
FIG. 6 schematically illustrates a further viewing transition example.

FIG. 6 schematically illustrates the middle-ground between these two examples 510 and 520. In the example 600, the user 500 moves their head a smaller distance than in the example 510 while also moving their eyes as in the example 520 (although to a lesser degree, due to the head motion).

Of course, the respective quantities of head and eye motion used to perform a particular viewing transition will vary from user to user. The information about the respective quantities of each motion for one or more transitions or transition types (such as large/small transitions) is stored in the user profile, as discussed above.

Figure 7:
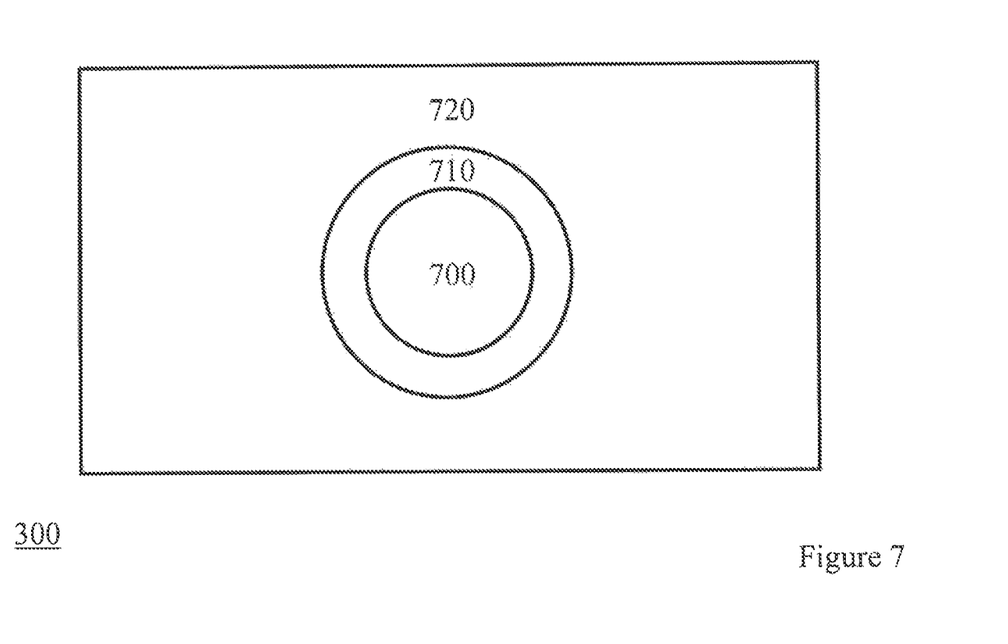
FIG. 7 schematically illustrates a display screen divided into regions for a second user.

FIG. 7 schematically illustrates an example in which a user has a smaller preferred (or maximum) eye-in-head radius than that shown in FIG. 4. While the focus area 700 is the same as the area 400 in FIG. 4, the region 710 is much smaller than its counterpart 410 in FIG. 4. Of course, the region 720 is larger than the region 720 as a result of this.

Such a characterisation of the different areas of the screen 300 may be useful in designing and/or modifying a gaze-based interaction with content. In such embodiments, a user is able to select (or otherwise interact with) a menu item or other interactive element in the displayed content by looking at it. While this may provide an intuitive and simple input method, a number of problems may arise.

A problem that is considered in the present application is that of the 'Midas Touch' effect; this effect is characterised by the accidental selection of menu items (or the like) simply by looking at them. One way in which this has been previously addressed is by using a timer to reduce the likelihood of accidental selection—for example, a user may be required to focus upon a particular element for five seconds in order to select it. Such a solution may detract from the user experience, however, as interactions may not feel so natural due to the delay caused by the timer. In addition to this, time taken to navigate menus may be increased significantly, and a user may be less able to react—for example, if seeking to pause a game the user may be vulnerable to attack for five seconds while selecting a pause icon.

Figure 8:
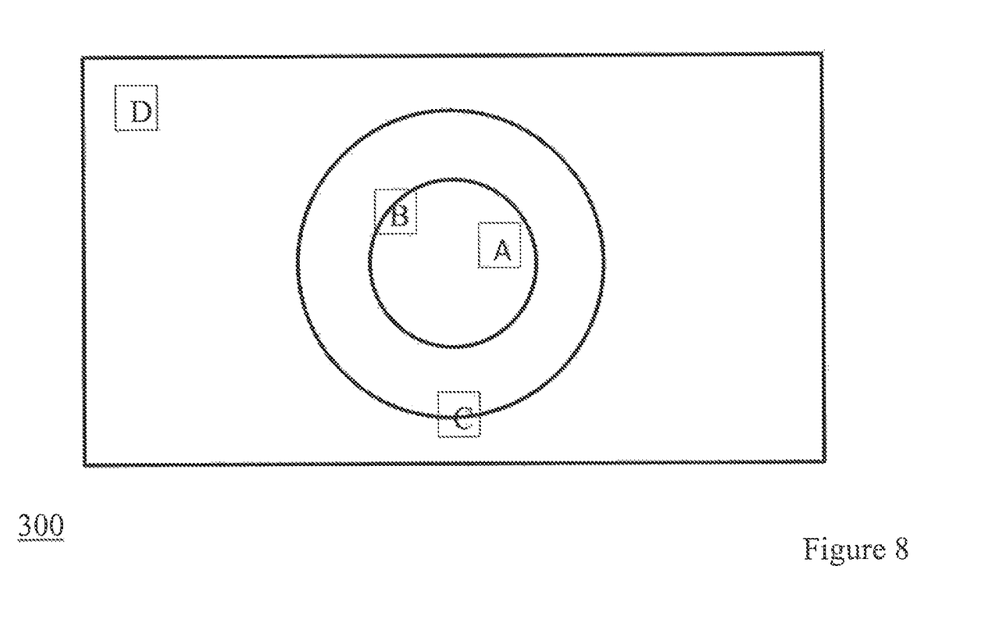
FIGS. 8-10 schematically illustrate interactive element layouts on a display screen.

FIG. 8 schematically illustrates a screen 300 comprising a number of menu items (labelled A, B, C, and D) corresponding to different actions.

Item A may be prone to accidental selection by a user, as it is within their central field of view. Item B may also suffer from this problem, as it is also present in the user's central field of view. Further to this, item B may cause problems in that the user may accidentally select the item due to not being able to view the whole of the item without moving their head.

In earlier arrangements, it would be expected that each of these items would be associated with a long timer for selection, so as to avoid accidental selection.

Item C may be considered awkwardly placed for a user, as it would require a significant degree of downwards head motion in order for the user to be able to view and select the icon. The fact that item C is intersected by the boundary may be problematic (as with item B), however it is less likely to be an issue for a user as it represents the extent of a user's eye motion and as such the user is likely to turn their head when seeking to select item C anyway.

Item D is clearly located in an inconvenient location for selection—however it is also the most resilient to accidental selection by a user. It would be considered advantageous to identify an area in which to place item D so as to achieve the same (or similar) level of resilience without inconveniencing the user too much when they do wish to select it.

Figure 9:
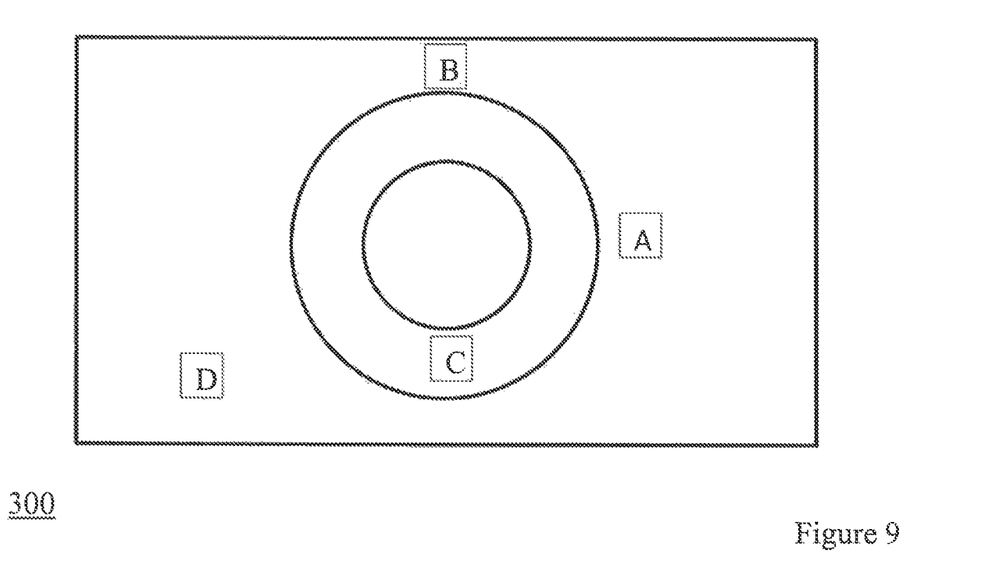

FIG. 9 schematically illustrates an alternative layout of the menu items shown in FIG. 8, based upon the regions shown in FIG. 4. That is, FIG. 9 shows an alternative layout that would be appropriate for a user that relies more heavily on eye motion where possible (that is, a user falling into the 'eye-mover' category described above).

In FIG. 9, item A has been moved out of the central area and outside of the user's view—the user must therefore turn their head to be able to select item A. This improves the resilience of item A to accidental selection significantly, without inconveniencing the user by requiring a significant amount of head motion or a time delay to select (although of course, a time delay may also be used—this time delay may be smaller for a well-placed item).

Item B has also been relocated, so as to be removed from the user's eye-in-head radius. Item B now appears directly above the user's field of view; this location is easy to access as the user is made aware that looking directly up (rather than in a direction that would need to be communicated with a numerical value for the angle) will lead them to item B, and the distance is not too large.

In contrast to items A and B, item C has been relocated so as to be closer to the centre of the user's field of view. In this location, the user is aware of the location of item C and may therefore be able to select it with ease. Item C may be resilient to accidental selection as a result of this, in conjunction with the fact that the bottom of the screen is often not as commonly viewed (for example, when playing a third-person game the user is unlikely to view the character they are controlling and therefore this area may not be viewed during normal use). Of course, such a 'non-use' area may be identified for a particular user and/or application freely.

Item D has been located so as to appear in a lesser-viewed area of the display that is more accessible than in the layout described with reference to FIG. 8. The determination of a suitable area may be made in dependence upon one or both of the user profile information and the content that is being displayed, as well as the function of the item.

Figure 10:
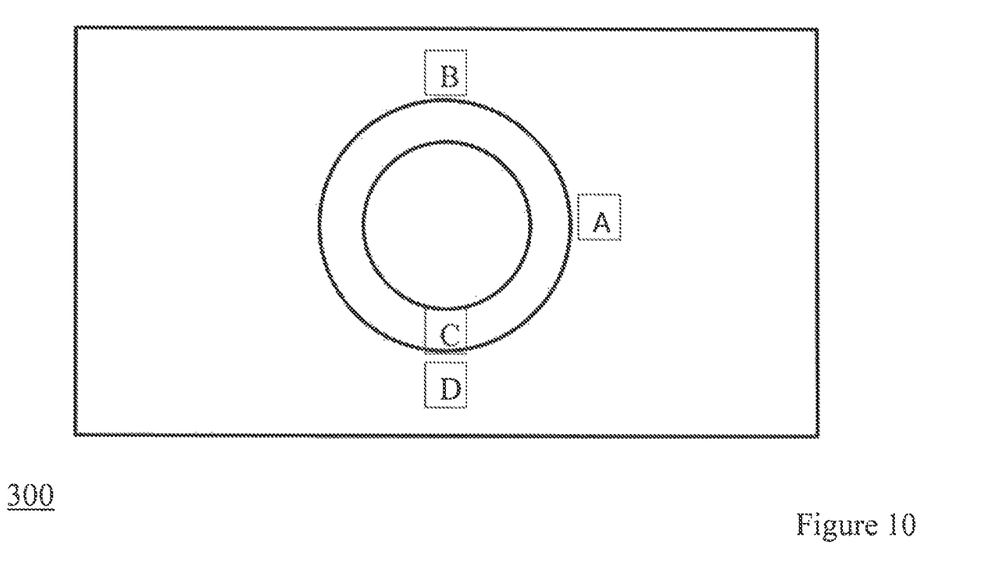

FIG. 10 schematically illustrates an alternative layout of the menu items shown in FIG. 9, this alternative layout being adapted for a viewer that is more inclined to move their head than the user in FIG. 9. The layout shown in FIG. 10 may therefore be considered to correspond to the eye-in-head radius shown in FIG. 7. That is, FIG. 10 shows an alternative layout that would be appropriate for a user that relies more heavily on head motion where possible (that is, a user falling into the 'head-mover' category described above). As noted above, the surrounding region is smaller in this case and as such the scope for accidental selection of icons for a given head position is reduced for items that would otherwise be in this region.

This is reflected by the positioning of items A, B and D, which are each closer to the central region that in FIG. 9. The location of item D has also been moved in view of this, as the new area may be identified as being suitably rarely viewed so as to be resilient to accidental selection despite its relative proximity. Items A, B, and D may each be physically viewable by a user without moving their head, by performing an uncharacteristic eye motion, which may be advantageous in enabling a user to make a quick selection.

In some embodiments, items may move in response to the user's head motion. For example, item C in either of FIGS. 9 and 10 may be stationary with respect to the user's head direction (e.g. move with their head) such that they are always able to make a selection of item C. While item C is located in a region that is viewed commonly below a threshold amount, the chances of accidental selection may be reduced significantly whilst providing a high level of user convenience.

In summary, FIGS. 9 and 10 illustrate alternative layouts for UI elements in dependence upon information in a user profile that describes how a user makes use of eye and head motion. This rearrangement may be performed in dependence upon a preferred eye-in-head radius of a user (such as a 'default' position that the user takes up during viewing/interaction), or it may be performed dynamically in dependence upon a user's current or predicted eye-in-head radius.

In some embodiments, a predication of a user's eye-in-head motion may be made based upon user interests or the like. For example, if it is expected that a user will want to view a particular part of the displayed content then a predicted eye-in-head radius may be identified based upon user profile information relating to expected head and/or eye positions.

The above description relates to a rearrangement of interactive elements so as to reduce the chances of accidental selection. Alternatively, or in addition, selection methods themselves may be modified in dependence upon a user's profile. This represents an alternative or additional content modification in response to a user profile, in that interaction methods to be used with the content should be regarded as a modification of the content.

Such a modification should use head and eye motion data in order to determine whether a selection is likely to be intentional or not. For example, a user may use a particular head/eye motion to view content and this should be regarded as simply viewing the item—instead, a non-characteristic head/eye motion should be regarded as a signal of intent to select the item.

FIGS. 11-14 schematically illustrate selection/non-selection steps, as an example of a possible modification of the selection method.

Figure 11:
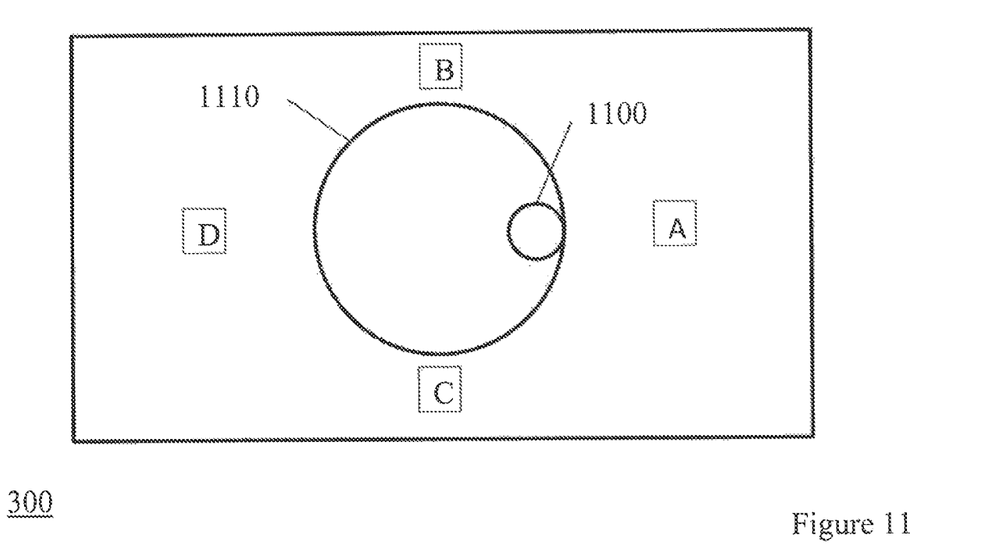

FIG. 11 schematically illustrates a screen 300 in which the items A-D have been positioned in a regular fashion outside of the user's eye-in-head radius 1110 (with the circle 1100 representing the user's gaze position). Of course, in such an example the user is unable to select any of the items accidentally without performing a head motion, as the user cannot (or will not) move their eyes sufficiently far so as to be able to gaze at an item.

Figure 12:
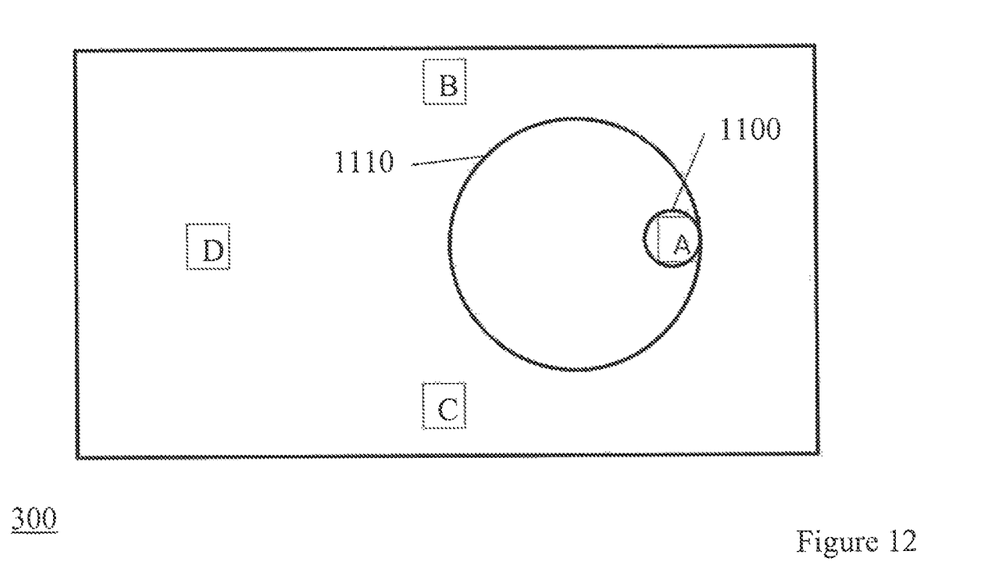

FIG. 12 schematically illustrates the same screen 300 in which the user has moved their head far enough that item A appears within the eye-in-head radius. In this example, the user profile information has identified that this is a characteristic motion for that user in order to allow them to view the content—for instance, the user may be identified as an 'eye-mover' and therefore the minimum amount of head motion should be expected.

As this has been identified as a characteristic viewing motion by analysing the user profile associated with the user, no selection is made. This may therefore mitigate the problem of a user attempting to view other areas of the display and accidentally selecting an item that they were not aware of due to being out of the field of view.

Figure 13:
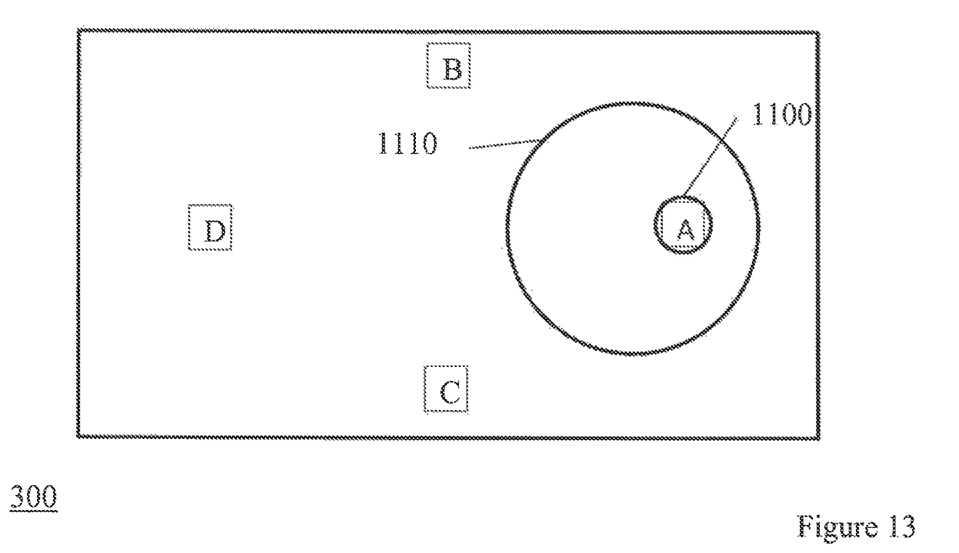

FIG. 13 schematically illustrates the same screen 300 in which the user has continued the head motion such that item A appears closer to the centre of the circle illustrating the eye-in-head radius. When the viewer directs their gaze 1100 to item A with this head position, it is inferred that a selection is intended due to this head/eye configuration not being in line with that expected for viewing an item in that position.

Figure 14:
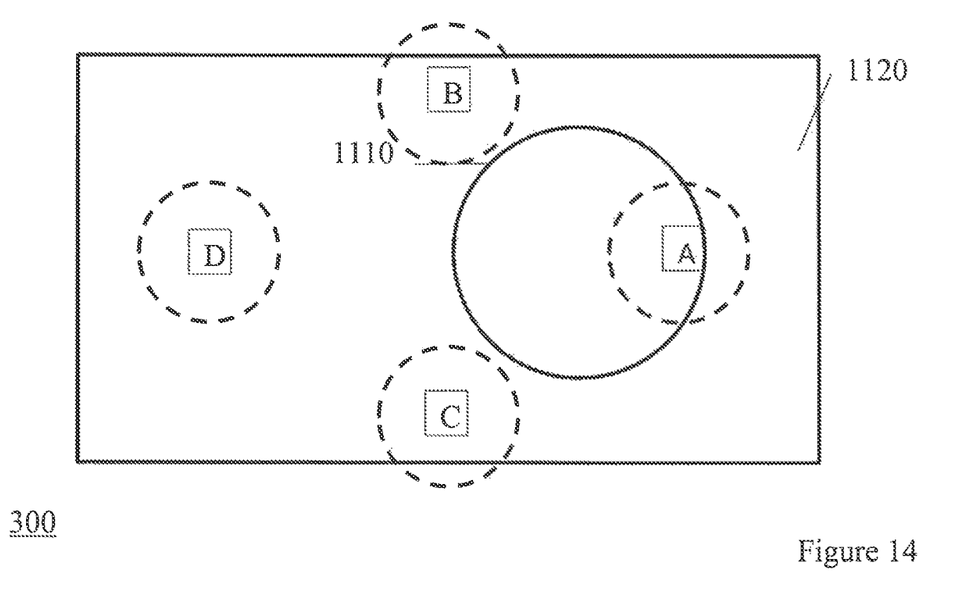
FIG. 14 schematically illustrates a selection process in which each interactive element has an associated selection radius.

FIG. 14 schematically illustrates an embodiment in which each of the items A, B, C, and D has a respective selection radius (also referred to as a selection area). In some embodiments, the user's eye-in-head radius has to fully encompass an item's selection radius in order for a selection to be made when the user gazes at the item. In other embodiments, a threshold amount the overlap between the selection radius and the eye-in-head radius may be prescribed that is less than 100% (but more than 0%). The selection of a required overlap to enable a selection may be determined on a per-user basis in dependence upon information contained in the user profile. For example, a higher threshold may be applied to those users who more commonly rely on head motion than to those users who rely more on eye motion. Different sizes of selection radii may also be used for different users, so as to facilitate or impede selection of an item in a given scenario.

Similarly, the threshold amount of overlap or the size of the selection radii may be varied in dependence upon the item or the content itself. For example, larger threshold amounts of overlap may be applied for items relating to a more disruptive action. For instance, 100% overlap may be required to select an item to quit a game, while only 70% overlap may be required for selecting an item to pause the game. By appropriate selection of these variables in dependence upon a user profile describing their use of head motion and eye motion, a system in which the number of erroneous selections is reduced without placing a significant burden upon the user in making intended selections.

While a selection area has been shown for each item that is larger than the item itself, in some embodiments the selection area simply matches the item. In such embodiments, an overlap between the user's eye-in-head radius and the item itself may be considered.

Figure 15:
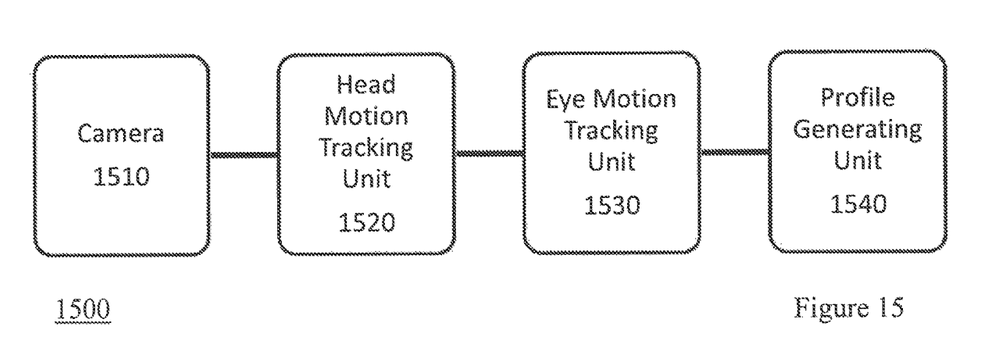
FIG. 15 schematically illustrates a user profile generating system.

FIG. 15 schematically illustrates a user profile generating system 1500 for generating a user profile for use with a processing device operable to display content. The system 1500 comprises one or more cameras 1510, a head motion tracking unit 1520, an eye motion tracking unit 1530 and a profile generating unit 1540.

The one or more cameras 1510 are operable to capture images of a user; examples of suitable devices include any visible light or IR cameras that capture images that may be used to identify motion of a user and/or the user's eyes. In some embodiments, cameras are used to detect both head and eye motion of a user, while in others specialised cameras (or other tracking devices) may be used to determine each motion. For example, imaging devices may be present in an HMD that are used to track eye motion.

The head motion tracking unit 1520 is operable to identify head motion of the user, for example from images of the user captured by the one or more cameras 1510. This may be achieved using any suitable motion tracking method. In some embodiments, the user may wear one or more markers that are used to simplify camera-based tracking methods. Alternatively, or in addition, the head motion tracking unit 1520 may use motion sensor data (such as from an accelerometer mounted upon an HMD worn by a user)—it is not essential that captured images are used to detect user head motion. It is therefore apparent that the head motion tracking unit is operable to identify head motion in dependence upon motion sensor data and/or camera data.

The eye motion tracking unit 1530 is operable to identify eye motion from images of the user; this may be performed using images captured by the one or more cameras 1510. Each eye may be tracked individually, or a single eye may be tracked and models used to predict a point of focus in dependence upon this, for example. Of course, some embodiments may not make use of cameras for performing eye tracking—in such cases, the eye motion tracking unit 1530 may instead perform processing to infer or predict a gaze direction.

For example, information may be gathered during the calibration process (or indeed, at any other time) that correlates head motion with the viewing of a particular area of the screen—the difference between the head orientation and the direction of the target may be taken to be indicative of an eye position of the user. A model may be generated, for example, that may be used to generate a predicted gaze direction based upon a measured head motion, and therefore a detection of the actual position of a user's eyes using image-based detection methods may be rendered unnecessary.

Other examples of methods that would not rely on explicit imaging of a user's eyes would include predictive methods, such as those based upon a user's past actions or known preferences. For example, if it is known that a user only likes to play a game for an hour, then any head motion towards a 'quit' option at this time may be taken to be indicative of the user's desire to quit the game. Similar methods may use information about which elements a user would typically view in a displayed image, with information either being provided by the user or being captured in a calibration process or the like.

The profile generating unit 1540 is operable to generate a user profile comprising head motion and eye motion information for the user. This motion information may be generated over any suitable period of time—for example, over a short calibration period, or over the whole of the user's experience with the system such that the profile is updated constantly. The generated user profile is used to modify interactions between the user and a processing device; as discussed above, this may be performed by modifying content in response to a calibration process using the profile information, or by modifying content in response to a characterisation of user interactions as compared to the user profile information. Hence the head motion information and the eye motion information may be understood to optionally comprise head motion preference information and eye motion preference information, characterising the user's behaviour optionally as a mainly head-movement user or a mainly eye-movement user, and/or optionally defining an angular extent from a default position for an object of interest beyond which the user will move their head. Any other information relevant to the user profile described herein may of course be included as appropriate.

As described above, a user profile identifies user preferences for eye motion and head motion. In some embodiments the user profile identifies proportions of head motion and eye motion used by a user in performing one or more viewing transitions between displayed content elements, and may also (or instead) identify a user as belonging to one or more categories in dependence upon their preferences for eye motion and head motion.

Interactions, as referred to above, may be any one or more of the list comprising viewing content, gaze-based inputs, gesture inputs, spoken inputs, and control device inputs. For example, a viewer that observes content is considered to be interacting with the content, as is a user who provides an input based upon their gaze direction, a hand or arm gesture, a voice command and/or a button press on a game controller. Of course, in some embodiments it is considered that a gaze direction may be combined with one or more of the other inputs to determine an interaction that is to take place.

Figure 16:
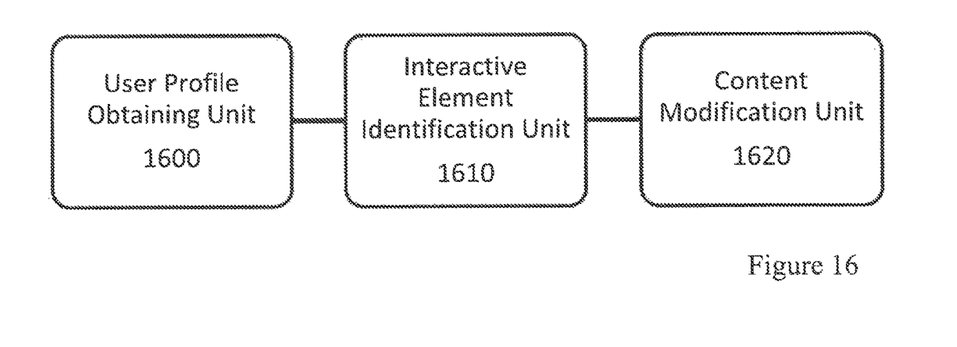
FIG. 16 schematically illustrates a processing system for modifying interactive content.

FIG. 16 schematically illustrates a processing system for modifying interactive content in dependence upon a user profile. The system comprises a user profile obtaining unit 1600, an interactive element identification unit 1610, and a content modification unit 1620. In some embodiments, the system of FIG. 16 has one or more associated cameras and/or tracking units operable to track a user's head motion and/or eye motion.

The user profile obtaining unit 1600 is operable to obtain the user profile comprising head motion and eye motion information for a user. The user profile may be generated by an associated profile generating system 1500, or may be acquired from a storage medium or any other suitable information source.

As described above, the user profile identifies user preferences for eye motion and head motion. In some embodiments, the user profile identifies proportions of head motion and eye motion used by a user in performing one or more viewing transitions between displayed content elements; alternatively, or in addition, the user profile identifies a user as belonging to one or more categories in dependence upon their preferences for eye motion and head motion. In some embodiments, the user profile identifies a preferred head orientation and eye orientation for a user—for example, a default viewing position that is adopted by a user.

The interactive element identification unit 1610 is operable to identify interactive elements in displayed content. For example, this may comprise the interactive element identification unit being operable to identify a selection area associated with each of the interactive elements.

The content modification unit 1620 is operable to modify interactions between a user and one or more of the identified interactive elements in dependence upon the obtained user profile. As described above, the modification of interactions can take any of a number of forms, such as relocating or modifying the interactive elements themselves or applying selection criteria for interacting with one or more of the elements.

In some embodiments, the content modification unit is operable to relocate one or more of the identified interactive elements; this may comprise the relocation of one or more of the identified interactive elements to an area outside of an area visible to a user at that user's preferred head orientation and eye orientation. This relocation may be performed in dependence upon a preferred eye-in-head radius of a user (such as a 'default' position as described above), or it may be performed dynamically in dependence upon a user's current or predicted eye-in-head radius.

In some embodiments, the content modification unit is operable to determine one or more selection criteria for one or more of the identified interactive elements; the selection criteria must be met before an interaction with an interactive element can be performed. One example of a selection criteria is one which comprises a required degree of overlap between a user's eye-in-head radius and an interactive element (the eye-in-head radius is a measure of the range of a user's gaze for a particular head position as identified from the user profile, as discussed above).

An alternative, or additional, example of a selection criteria for one or more of the identified interactive elements is one which comprises a comparison between an attempted gaze selection by the user and an expected change in gaze identified from information in the user profile—such a selection criteria is satisfied if the attempted gaze selection by the user deviates from an expected change in gaze identified from information in the user profile.

Figure 17:
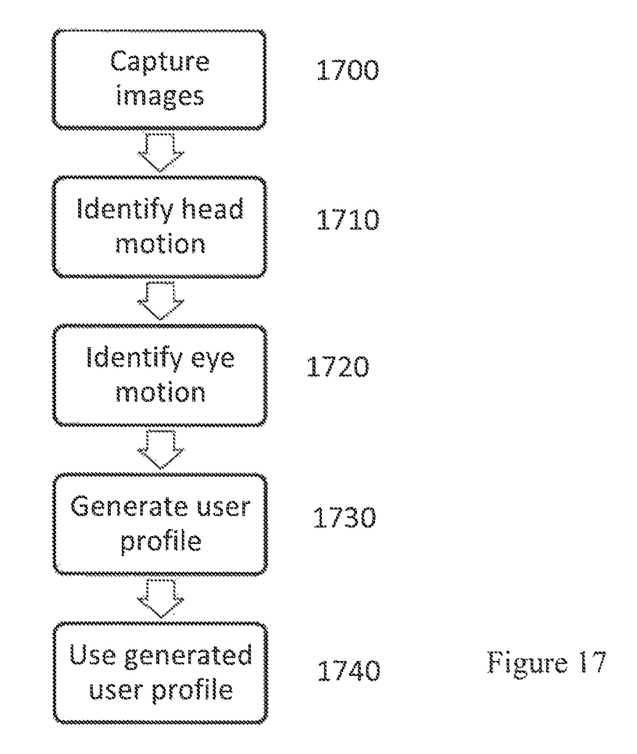
FIG. 17 schematically illustrates a user profile generating method.

FIG. 17 schematically illustrates a user profile generating method for generating a user profile for use with a processing device operable to display content.

A step 1700 comprises capturing images of a user; this step 1700 may further comprise gathering data from inertial sensors or the like that may also be used to identify motion of the user.

A step 1710 comprises identifying head motion of the user.

A step 1720 comprises identifying eye motion from images of the user.

A step 1730 comprises generating a user profile comprising information about head motion and eye motion for the user.

A step 1740 comprises using the generated user profile to modify interactions between the user and a processing device.

Figure 18:
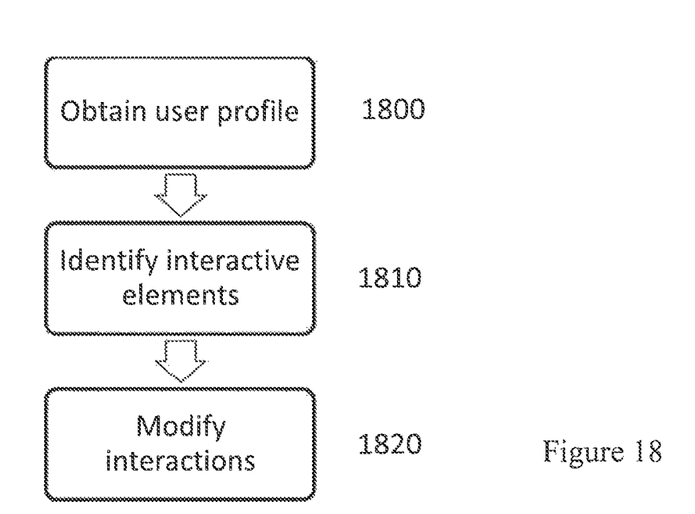
FIG. 18 schematically illustrates a processing method for modifying interactive content.

FIG. 18 schematically illustrates a processing method for modifying interactive content in dependence upon a user profile.

A step 1800 comprises obtaining the user profile comprising information about head motion and eye motion for a user.

A step 1810 comprises identifying interactive elements in displayed content.

A step 1820 comprises modifying interactions between a user and one or more of the identified interactive elements in dependence upon the obtained user profile.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A method for modifying interactive content in dependence upon a user profile, the method comprising:
   obtaining the user profile comprising information about an eye-in-head radius, the eye-in-head radius representing an amount of a display viewable by a user by moving their eyes only, and without moving their head;
   identifying interactive elements in displayed content;
   identifying a respective selection area associated with each of the identified interactive elements; and
   modifying interactions between the user and one or more of the identified interactive elements in dependence upon the obtained user profile, wherein the modifying includes:
   locating one or more of the identified interactive elements in dependence on the eye-in-head radius, and
   selecting a given one of the identified interactive elements by evaluating selection criteria, which includes determining one of the respective selection areas associated with the given one of the identified interactive elements, and determining whether an overlap threshold between the eye-in-head radius and the one of the respective selection areas has been reached as to the given one of the identified interactive elements, and if so performing an interaction with the given one of the identified interactive elements, and wherein:
   the eye-in-head radius represents a maximal area of the display that is larger than, and circumscribes, a given focus area at which the user gazes on the display, where the maximal area of the display includes only the amount of the display viewable by the user by moving their eyes only, and without moving their head,
   each of the respective selection areas includes a respective predefined area that is larger than, and circumscribes, the respective identified interactive element, and
   the selecting the given one of the identified interactive elements is based on determining whether the respective selection area associated with the given one of the identified interactive elements at least partially overlaps the eye-in-head radius when the user is gazing at a given focus area.

2. The method according to claim 1, wherein the user profile identifies user preferences for eye motion and head motion.

3. The method according to claim 2, wherein the user profile identifies proportions of head motion and eye motion used by the user in performing one or more viewing transitions between displayed content elements.

4. The method according to claim 2, wherein the user profile identifies the user as belonging to one or more categories in dependence upon their preferences for eye motion and head motion.

5. The method according to claim 2, wherein the user profile identifies a preferred head orientation and eye orientation for the user.

6. The method according to claim 1, wherein the interaction with the corresponding interactive element is a selection.

7. The method according to claim 1, wherein the interactive elements include menu items.

8. The method according to claim 1, wherein at least one of:
   the overlap threshold is determined in dependence upon information contained in the user profile;
   the overlap threshold is determined in dependence upon the interactive object to which the selection area corresponds; and
   the overlap threshold is determined in dependence upon the content comprising the interactive elements.

9. The method according to claim 1, wherein the selection area is larger than the interactive element.

10. The method according to claim 1, wherein the modifying includes locating the identified interactive elements in respect of a default or preferred viewpoint of the user.

11. The method according to claim 1, wherein the displayed content is displayed using a head-mountable display device.

12. The method according to claim 1, wherein the overlap threshold indicates a required amount of the respective selection area associated with each of the identified interactive elements that must be encompassed by the eye-in-head radius to enable performance of the interaction.

13. The method according to claim 1, wherein the selection criteria includes determining whether the user's gaze direction indicates that the user is gazing at the given one of the identified interactive elements at the time that the overlap threshold has been reached.

14. A non-transitory machine-readable storage medium which stores computer software, which when executed by a computer system, causes the computer system to perform a processing method for modifying interactive content in dependence upon a user profile, by carrying out actions, comprising:
   obtaining the user profile comprising information about an eye-in-head radius, the eye-in-head radius representing an amount of a display viewable by a user by moving their eyes only, and without moving their head;
   identifying interactive elements in displayed content;
   identifying a respective selection area associated with each of the identified interactive elements; and
   modifying interactions between the user and one or more of the identified interactive elements in dependence upon the obtained user profile, wherein the modifying includes:
   locating one or more of the identified interactive elements in dependence on the eye-in-head radius, and
   selecting a given one of the identified interactive elements by evaluating selection criteria, which includes determining one of the respective selection areas associated with the given one of the identified interactive elements, and determining whether an overlap threshold between the eye-in-head radius and the one of the respective selection areas has been reached as to the given one of the identified interactive elements, and if so performing an interaction with the given one of the identified interactive elements, and wherein:

the eye-in-head radius represents a maximal area of the display that is larger than, and circumscribes, a given focus area at which the user gazes on the display, where the maximal area of the display includes only the amount of the display viewable by the user by moving their eyes only, and without moving their head, each of the respective selection areas includes a respective predefined area that is larger than, and circumscribes, the respective identified interactive element, and the selecting the given one of the identified interactive elements is based on determining whether the respective selection area associated with the given one of the identified interactive elements at least partially overlaps the eye-in-head radius when the user is gazing at a given focus area.

* * * * *